(12) United States Patent
Suzuki et al.

(10) Patent No.: US 8,609,790 B2
(45) Date of Patent: Dec. 17, 2013

(54) PRODUCTION PROCESS OF GRANULAR POLY(ARYLENE SULFIDE)

(75) Inventors: Kenji Suzuki, Tokyo (JP); Tomoyoshi Koizumi, Tokyo (JP); Yoshinori Shiojiri, Tokyo (JP)

(73) Assignee: Kureha Corporation, Tokyo (JP)

( * ) Notice: Subject to any disclaimer, the term of this patent is extended or adjusted under 35 U.S.C. 154(b) by 338 days.

(21) Appl. No.: 13/056,433

(22) PCT Filed: Jun. 10, 2009

(86) PCT No.: PCT/JP2009/060599
§ 371 (c)(1),
(2), (4) Date: Jan. 28, 2011

(87) PCT Pub. No.: WO2010/013545
PCT Pub. Date: Feb. 4, 2010

(65) Prior Publication Data
US 2011/0178268 A1    Jul. 21, 2011

(30) Foreign Application Priority Data
Jul. 31, 2008   (JP) ................................ 2008-197688

(51) Int. Cl.
*C08F 283/00*   (2006.01)

(52) U.S. Cl.
USPC ........... 525/537; 528/388; 528/389; 528/489; 528/499

(58) Field of Classification Search
USPC ........... 525/537; 528/388, 389, 488, 489, 499
See application file for complete search history.

(56) References Cited

U.S. PATENT DOCUMENTS

| | | | |
|---|---|---|---|
| 3,322,834 A | 5/1967 | Hill, Jr. et al. | |
| 3,354,129 A | 11/1967 | Hill, Jr. et al. | |
| 3,919,177 A | 11/1975 | Campbell | |
| 4,016,145 A | 4/1977 | Campbell | |
| 4,038,263 A | 7/1977 | Edmonds, Jr. et al. | |
| 4,645,826 A | 2/1987 | Iizuka et al. | |
| 5,151,495 A | 9/1992 | Inoue et al. | |
| 2005/0215759 A1 | 9/2005 | Matsuzaki et al. | |
| 2006/0084785 A1 | 4/2006 | Sato et al. | |
| 2006/0089486 A1 * | 4/2006 | Sato et al. | 528/381 |
| 2007/0265425 A1 * | 11/2007 | Suzuki et al. | 528/388 |

FOREIGN PATENT DOCUMENTS

| | | |
|---|---|---|
| EP | 166368 A2 | 1/1986 |
| EP | 323723 A2 | 7/1989 |
| EP | 1577336 A1 | 9/2005 |
| JP | 45-3368 A1 | 2/1970 |
| JP | 52-12240 | 5/1977 |
| JP | 59-219332 | 12/1984 |
| JP | 63-33775 | 7/1988 |
| JP | 1-161022 | 6/1989 |
| JP | 7-10997 A1 | 1/1995 |
| JP | 08-183858 A1 | 7/1996 |
| JP | 10-087831 A1 | 4/1998 |
| JP | 2000-191785 | 7/2000 |
| JP | 2003-176357 | 6/2003 |
| JP | 2004-51732 A1 | 2/2004 |
| JP | 2004-352923 A1 | 12/2004 |
| WO | 2004-009674 A1 | 1/2004 |
| WO | 2004/060972 A1 | 7/2004 |

* cited by examiner

*Primary Examiner* — Shane Fang
(74) *Attorney, Agent, or Firm* — Porter Wright Morris & Arthur LLP

(57) ABSTRACT

The invention provides a production process of a granular poly(arylene sulfide) by polymerizing a sulfur source and a dihalo-aromatic compound in an organic amide solvent by a polymerization process containing a phase-separation polymerization step, wherein the production process contains a step I of adding an aromatic compound in a proportion of 0.01 to 20 mol per 100 mol of the organic amide solvent into the liquid phase containing the organic amide solvent and a formed polymer within the polymerization reaction system, said liquid phase being in the phase-separated state, after the phase-separation polymerization step; a step II of cooling the liquid phase within the polymerization reaction system; and a step III of collecting the formed polymer from the liquid phase.

15 Claims, No Drawings

PRODUCTION PROCESS OF GRANULAR POLY(ARYLENE SULFIDE)

TECHNICAL FIELD

The present invention relates to a production process of a granular poly(arylene sulfide). More particularly, the present invention relates to a process for producing a granular poly(arylene sulfide) by polymerizing a sulfur source and a dihalo-aromatic compound in an organic amide solvent according to a polymerization process comprising a phase-separation polymerization step, by which a granular poly(arylene sulfide) can be collected at a high yield while retaining a melt viscosity at a high level.

BACKGROUND ART

Poly(arylene sulfides) (hereinafter abbreviated as "PASs") represented by poly(phenylene sulfide) (hereinafter abbreviated as "PPS") are engineering plastics excellent in heat resistance, chemical resistance, flame retardancy, mechanical strength, electrical properties, dimensional stability, etc. The PASs are commonly used in a wide variety of fields such as electrical and electronic equipments and automotive equipments because they can be molded or formed into various kinds of molded or formed products, films, sheets, fibers, etc. by general melt processing processes such as extrusion, injection molding and compression molding.

As a typical production process of a PAS, is known a process in which a sulfur source is reacted with a dihalo-aromatic compound in an organic amide solvent such as N-methyl-2-pyrrolidone. As the sulfur source, is generally used an alkali metal sulfide, an alkali metal hydrosulfide or a mixture thereof. When the alkali metal hydro sulfide is used as the sulfur source, the alkali metal hydrosulfide is used in combination with an alkali metal hydroxide. When at least one sulfur source selected from the group consisting of alkali metal sulfides and alkali metal hydrosulfides is reacted with a dihalo-aromatic compound, a great amount of an alkali metal salt such as NaCl is secondarily produced by a desalting condensation reaction.

For example, Japanese Patent Publication No. 45-3368 (Patent Literature 1) discloses a process for producing poly(phenylene sulfide) by reacting sodium sulfide and p-dichlorobenzene in an organic amide solvent such as N-methyl-2-pyrrolidone. However, the process disclosed in Patent Literature 1 can provide only PPS having a low molecular weight. When the low-molecular weight PPS is heated in the presence of air to cure it, the molecular weight thereof can be increased. However, the PPS whose molecular weight has been increased by the oxidative cure (curing) is insufficient in mechanical properties such as toughness.

Thus, there have been proposed various processes for producing a high-molecular weight PAS using various polymerization aids in a production process of a PAS by polymerizing a sulfur source and a dihalo-aromatic compound in an organic amide solvent. For example, Japanese Patent Publication No. 52-12240 (Patent Literature 2) discloses a production process of PPS using a carboxylic acid alkali metal salt as the polymerization aid. Japanese Patent Application Laid-Open No. 59-219332 (Patent Literature 3) discloses a production process of PPS using an alkaline earth metal salt or zinc salt of an aromatic carboxylic acid as the polymerization aid. U.S. Pat. No. 4,038,263 (Patent Literature 4) discloses a production process of PPS using an alkali metal halide as the polymerization aid. Japanese Patent Application Laid-Open No. 1-161022 (Patent Literature 5) discloses a production process of PPS using the sodium salt of an aliphatic carboxylic acid as the polymerization aid. Japanese Patent Publication No. 63-33775 (Patent Literature 6) and Japanese Patent Application Laid-Open No. 8-183858 (Patent Literature 7) disclose a production process of a PAS using water as the polymerization aid.

The amount and time of the polymerization aid added, the temperature of a polymerization reaction system, etc. are controlled, whereby a phase-separated state that a concentrated formed polymer phase and a dilute formed polymer phase are present in a mixed state can be created in a liquid phase within the polymerization reaction system. When the polymerization reaction is continued in such a phase-separated state, the formation of a high-molecular weight PAS is caused to progress, and moreover the high-molecular weight PAS can be obtained in the form of granules by slowly cooling the polymerization reaction system after the polymerization reaction. Therefore, these polymerization aids are called phase separation agents.

More specifically, when at least one sulfur source selected from the group consisting of alkali metal sulfides and alkali metal hydrosulfides is reacted with a dihalo-aromatic compound, a desalting condensation reaction between the monomers is caused to rapidly progress to increase the conversion of the dihalo-aromatic compound. However, the polymer in this state is low in both melt viscosity and molecular weight and is in a stage of the so-called prepolymer.

When a phase separation agent is caused to exist in a liquid phase within a high-temperature polymerization reaction system, a phase-separated state that a concentrated formed polymer phase and a dilute formed polymer phase are present in a mixed state in the liquid phase is created. An alkali metal salt such as NaCl is present in a great amount in the dilute formed polymer phase. The concentrated formed polymer phase contains many of a formed polymer in the liquid phase. When the liquid phase is stirred, the concentrated formed polymer phase is dispersed in the dilute formed polymer phase, and a condensation reaction between the prepolymers is caused to efficiently progress in the concentrated phase. As a result, the formation of a high-molecular weight polymer is advanced.

When the liquid phase is sifted by a screen after the polymerization reaction, a granular PAS having a high molecular weight is captured on the screen. Impurities such as a secondarily formed alkali metal salt and oligomers are easy to be removed by washing from the high-molecular weight granular PAS. At present, the high-molecular weight granular PAS is washed by a combination of water washing, washing with an organic solvent, acid washing, etc., in a post treatment step after polymerization whereby a PAS substantially containing no alkali metal salt such as NaCl comes to be obtained.

As described above, the high-molecular weight granular PAS can be obtained according to the production process of the PAS comprising the phase-separation polymerization step using the phase separation agent. Impurities such as the secondarily formed alkali metal salt and oligomers are easy to be removed by washing from the granular PAS. On the contrary, the yield of the granular PAS is not always sufficiently high, and a great amount of oligomers or the like removed by washing is disposed as industrial waste.

With the increasing interest in environmental problems in recent years, a production process little in industrial waste has been more and more required even in a technical field of polymers. Even in the production process of a granular PAS comprising the phase-separation polymerization step, there is a latent requirement for reduction in waste such as oligomers and a finely particulate PAS. When the yield of the granular PAS is improved, it is expected to reduce the production of the oligomers and finely particulate PAS.

However, interest in reduction of the production of the oligomers and finely particulate PAS has been little in the prior art, and moreover there has been a limit to technical solving means for increasing the yield of the granular PAS. In addition, in the production process of the PAS comprising a step of polymerizing the sulfur source and the dihalo-aromatic compound in the organic amide solvent, it has been proved that it is preferable to adopt a process of adding an alkali metal hydroxide (for example, NaOH) in excess to the charged sulfur source within the polymerization reaction system for the purpose of stabilizing the polymerization reaction. According to this process, however, there is a tendency for the production of pasty oligomers and a finely particulate PAS to increase, and the yield of the granular PAS is lowered. This tendency becomes stronger as the molecular weight or melt viscosity of the PAS is higher.

CITATION LIST

Patent Literature

Patent Literature 1: Japanese Patent Publication No. 45-3368
Patent Literature 2: Japanese Patent Publication No. 52-12240
Patent Literature 3: Japanese Patent Application Laid-Open No. 59-219332
Patent Literature 4: U.S. Pat. No. 4,038,263
Patent Literature 5: Japanese Patent Application Laid-Open No. 1-161022
Patent Literature 6: Japanese Patent Publication No. 63-33775
Patent Literature 7: Japanese Patent Application Laid-Open No. 8-183858

SUMMARY OF THE INVENTION

Technical Problem

It is an object of the present invention to provide a production process of a poly(arylene sulfide), by which a granular poly(arylene sulfide) can be obtained at a high yield while retaining a melt viscosity at a high level.

Another object of the present invention is to provide a production process of a poly(arylene sulfide), by which a high-molecular weight granular poly(arylene sulfide) can be obtained at a high yield even when the molar ratio of an alkali metal hydroxide to a charged sulfur source is controlled for stabilizing a polymerization reaction.

A further object of the present invention is to provide a production process of a poly(arylene sulfide), by which the production of pasty oligomers and a finely particulate polymer is reduced, and the amount of industrial waste can thereby be reduced.

The present inventors have carried out an extensive investigation with a view toward achieving the above objects. As a result, it has been found that in a production process of a poly(arylene sulfide) comprising a step of polymerizing a sulfur source and a dihalo-aromatic compound in an organic amide solvent, wherein the polymerization step comprises a phase-separation polymerization step that the polymerization reaction is continued in the presence of a phase separation agent in a phase-separated state that a concentrated formed polymer phase and a dilute formed polymer phase are present in a mixed state in a liquid phase within the polymerization reaction system, a small amount of an aromatic compound is added into the liquid phase within the polymerization reaction system after the phase-separation polymerization step, said liquid phase containing the organic amide solvent and a formed polymer and being in the phase-separated state, and the liquid phase is then cooled, whereby a granular poly(arylene sulfide) can be collected at a high yield while retaining a melt viscosity at a high level.

According to the production process of the present invention, a high-molecular weight granular poly(arylene sulfide) can be obtained at a high yield while retaining a melt viscosity at a high level by the mere addition of a relatively simple step to the conventional phase-separation polymerization process. The yield of the granular PAS is increased, whereby the amount of oligomers and a finely particulate PAS that will be removed by washing can be reduced.

In addition, according to the production process of the present invention, a high-molecular weight granular poly(arylene sulfide) can be obtained at a high yield even when the molar ratio of an alkali metal hydroxide to a charged sulfur source is controlled for stabilizing a polymerization reaction. The present invention has been led to completion on the basis of these findings.

Solution to Problem

According to the present invention, there is provided a production process of a granular poly(arylene sulfide), comprising a step of polymerizing a sulfur source and a dihalo-aromatic compound in an organic amide solvent, said polymerization step comprising a phase-separation polymerization step that the polymerization reaction is continued in the presence of a phase separation agent in a phase-separated state that a concentrated formed polymer phase and a dilute formed polymer phase are present in a mixed state in a liquid phase within the polymerization reaction system, wherein the production process comprises (1) a step I of adding an aromatic compound in a proportion of 0.01 to 20 mol per 100 mol of the organic amide solvent into the liquid phase containing the organic amide solvent and a formed polymer within the polymerization reaction system, said liquid phase being in the phase-separated state, after the phase-separation polymerization step; (2) a step II of cooling the liquid phase within the polymerization reaction system; and (3) a step III of collecting the formed polymer from the liquid phase.

According to the present invention, there is provided, as a preferred embodiment, the production process, in which the polymerization step is conducted through at least the following 2 steps:

(I) a first-stage polymerization step of subjecting the sulfur source and the dihalo-aromatic compound to a polymerization reaction at a temperature of 170 to 270° C. in the organic amide solvent in a state that water is present in a proportion of 0.02 to 2.0 mol per mol of the charged sulfur source, thereby forming a polymer that a conversion of the dihalo-aromatic compound is 80 to 99%; and (II) a second-stage polymerization step of causing at least one phase separation agent selected from the group consisting of water, organic carboxylic acid metal salts, organic sulfonic acid metal salts, alkali metal halides, alkaline earth metal halides, aromatic carboxylic acid alkaline earth metal salts, phosphoric acid alkali metal salts, alcohols and paraffinic hydrocarbons to exist within a range of from 0.01 to 10 mol per mol of the charged sulfur source and heating the polymerization reaction system to a temperature of 245 to 290° C., thereby converting the liquid phase within the polymerization reaction system to the phase-separated state to continue the polymerization reaction.

According to the present invention, there is provided, as another preferred embodiment, the production process, in which the polymerization step is conducted through at least the following 2 steps:

(1) a first-stage polymerization step of subjecting the sulfur source and the dihalo-aromatic compound to a polymerization reaction at a temperature of 170 to 270° C. in the organic amide solvent in a state that water is present in a proportion of 0.02 to 2.0 mol per mol of the charged sulfur source, thereby forming a polymer that a conversion of the dihalo-aromatic compound is 80 to 99%; and (2) a second-stage polymerization step of controlling the amount of water in the polymerization reaction system so as to bring about a state that water exists in a proportion of from higher than 2.0 mol to not higher than 10 mol per mol of the charged sulfur source, and heating the polymerization reaction system to a temperature of 245 to 290° C., thereby converting the liquid phase within the polymerization reaction system to the phase-separated state to continue the polymerization reaction.

According to the present invention, there is provided, as a further preferred embodiment, the production process, in which the polymerization step is conducted through at least the following 4 steps:

(a) a dehydration step a of heating and reacting a mixture containing the organic amide solvent, an alkali metal hydrosulfide and an alkali metal hydroxide in a proportion of 0.95 to 1.05 mol per mol of the alkali metal hydrosulfide to discharge at least a part of a distillate containing water from the interior of the system containing the mixture to the exterior of the system;

(b) a charging step b of adding an alkali metal hydroxide and water to the mixture remaining in the system after the dehydration step, as needed, to adjust the mixture in such a manner that the total number of moles of the number of moles of an alkali metal hydroxide formed with hydrogen sulfide formed upon the dehydration, the number of moles of the alkali metal hydroxide added prior to the dehydration and the number of moles of the alkali metal hydroxide added after the dehydration becomes 1.00 to 1.09 mol per mol of a charged sulfur source including the alkali metal hydrosulfide existing in the system after the dehydration as a sulfur source, and the number of moles of water becomes 0.02 to 2.0 mol per mol of the charged sulfur source;

(c) a first-stage polymerization step c of adding the dihalo-aromatic compound to the mixture to subject the charged sulfur source and the dihalo-aromatic compound to a polymerization reaction at a temperature of 170 to 270° C. in the organic amide solvent, thereby forming a polymer that a conversion of the dihalo-aromatic compound is 80 to 99%; and (d) a second-stage polymerization step d of causing at least one phase separation agent selected from the group consisting of water, organic carboxylic acid metal salts, organic sulfonic acid metal salts, alkali metal halides, alkaline earth metal halides, aromatic carboxylic acid alkaline earth metal salts, phosphoric acid alkali metal salts, alcohols and paraffinic hydrocarbons to exist within a range of from 0.01 to 10 mol per mol of the charged sulfur source and heating the polymerization reaction system to a temperature of 245 to 290° C., thereby converting the liquid phase within the polymerization reaction system to the phase-separated state to continue the polymerization reaction.

According to the present invention, there is provided, as a still further preferred embodiment, the production process, in which the polymerization step is conducted through at least the following 4 steps:

(A) a dehydration step 1 of heating and reacting a mixture containing the organic amide solvent, an alkali metal hydrosulfide and an alkali metal hydroxide in a proportion of 0.95 to 1.05 mol per mol of the alkali metal hydrosulfide to discharge at least a part of a distillate containing water from the interior of the system containing the mixture to the exterior of the system;

(B) a charging step 2 of adding an alkali metal hydroxide and water to the mixture remaining in the system after the dehydration step, as needed, to adjust the mixture in such a manner that the total number of moles of the number of moles of an alkali metal hydroxide formed with hydrogen sulfide formed upon the dehydration, the number of moles of the alkali metal hydroxide added prior to the dehydration and the number of moles of the alkali metal hydroxide added after the dehydration becomes 1.00 to 1.09 mol per mol of a charged sulfur source including the alkali metal hydrosulfide existing in the system after the dehydration as a sulfur source, and the number of moles of water becomes 0.02 to 2.0 mol per mol of the charged sulfur source;

(C) a first-stage polymerization step 3 of adding the dihalo-aromatic compound to the mixture to subject the charged sulfur source and the dihalo-aromatic compound to a polymerization reaction at a temperature of 170 to 270° C. in the organic amide solvent, thereby forming a polymer that a conversion of the dihalo-aromatic compound is 80 to 99%; and (D) a second-stage polymerization step 4 of controlling the amount of water in the polymerization reaction system so as to bring about a state that water exists in a proportion of from more than 2.0 mol to not more than 10 mol per mol of the charged sulfur source, and heating the polymerization reaction system to a temperature of 245 to 290° C., thereby converting the liquid phase within the polymerization reaction system to the phase-separated state to continue the polymerization reaction.

Advantageous Effects of Invention

According to the production process of the present invention, a granular PAS can be obtained at a high yield while retaining a melt viscosity at a high level. According to the production process of the present invention, a high-molecular weight granular PAS can be obtained at a high yield even when the molar ratio of the alkali metal hydroxide to the charged sulfur source is controlled. According to the production process of the present invention, the yield of the high-molecular weight granular PAS can be increased, so that the production of by-products such as oligomers and a finely particulate PAS that will be disposed as industrial waste can be reduced.

DESCRIPTION OF EMBODIMENTS

1. Sulfur Source

In the present invention, at least one sulfur source selected from the group consisting of alkali metal sulfides and alkali metal hydrosulfides is used as a sulfur source. As examples of the alkali metal sulfides, may be mentioned lithium sulfide, sodium sulfide, potassium sulfide, rubidium sulfide, cesium sulfide and mixtures of two or more compounds thereof. As examples of the alkali metal hydrosulfides, may be mentioned lithium hydrosulfide, sodium hydrosulfide, potassium hydrosulfide, rubidium hydrosulfide, cesium hydrosulfide and mixtures of two or more compounds thereof.

The alkali metal sulfide may be used in any form of an anhydride, a hydrate and an aqueous solution. Among these, sodium sulfide and lithium sulfide are preferred in that they are industrially available on the cheap. The alkali metal sulfide is preferably used as an aqueous mixture (i.e., a mixture with water having fluidity) such as an aqueous solution from the viewpoints of processing operation, metering, etc.

The alkali metal hydrosulfide may be used in any form of an anhydride, a hydrate and an aqueous solution. Among these, sodium hydrosulfide and lithium hydrosulfide are preferred in that they are industrially available on the cheap. The alkali metal hydrosulfide is preferably used as an aqueous mixture (i.e., a mixture with water having fluidity) such as an aqueous solution from the viewpoints of processing operation, metering, etc.

In general, a small amount of an alkali metal hydrosulfide is secondarily produced in a production process of the alkali metal sulfide. A small amount of the alkali metal hydrosulfide may be contained in the alkali metal sulfide used in the present invention. In this case, the total molar quantity of the alkali metal sulfide and alkali metal hydrosulfide becomes a charged sulfur source after a dehydration step.

On the other hand, in general, a small amount of an alkali metal sulfide is secondarily produced in a production process of the alkali metal hydrosulfide. A small amount of the alkali metal sulfide may be contained in the alkali metal hydrosulfide used in the present invention. In this case, the total molar quantity of the alkali metal hydrosulfide and alkali metal sulfide becomes a charged sulfur source after a dehydration step. When the alkali metal sulfide and the alkali metal hydrosulfide are mixed and used in combination, a mixture of both naturally becomes a charged sulfur source.

When the sulfur source contains the alkali metal hydrosulfide, an alkali metal hydroxide is used in combination. Examples of the alkali metal hydroxide include lithium hydroxide, sodium hydroxide, potassium hydroxide, rubidium hydroxide, cesium hydroxide and mixtures of two or more compounds thereof. Among these, sodium hydroxide and lithium hydroxide are preferred in that they are industrially available on the cheap. The alkali metal hydroxide is preferably used as an aqueous mixture such as an aqueous solution.

In the production process according to the present invention, examples of water to be dehydrated in the dehydration step includes water of hydration, a water medium of an aqueous solution and water secondarily produced in a reaction of the alkali metal hydrosulfide with the alkali metal hydroxide.

2. Dihalo-aromatic Compound

The dihalo-aromatic compound used in the present invention is a dihalogenated aromatic compound having 2 halogen atoms directly bonded to an aromatic ring. Specific examples of the dihalo-aromatic compound include o-dihalobenzenes, m-dihalobenzenes, p-dihalobenzenes, dihalotoluenes, dihalonaphthalenes, methoxy-dihalobenzenes, dihalobiphenyls, dihalobenzoic acids, dihalodiphenyl ethers, dihalodiphenyl sulfones, dihalodiphenyl sulfoxides and dihalodiphenyl ketones.

Here, the halogen atom means each atom of fluorine, chlorine, bromine and iodine, and 2 halogen atoms in the same dihalo-aromatic compound may be the same or different from each other. These dihalo-aromatic compounds may be used either singly or in any combination thereof.

The charged amount of the dihalo-aromatic compound is generally 0.90 to 1.50 mol, preferably 0.95 to 1.10 mol, more preferably 1.00 to 1.07 mol, particularly preferably 1.005 to 1.05 mol per mol of the sulfur source (alkali metal sulfide and/or alkali metal hydrosulfide) remaining in the system after a dehydration step. If the charged amount of the dihaloaromatic compound is too small, a decomposition reaction is easy to occur. If the charged amount is too great, it is difficult to make the molecular weight of a formed polymer high.

3. Branching or Crosslinking Agent and Molecular Weight Controlling Agent

In order to introduce a branched or crosslinked structure into a formed PAS, a polyhalo-compound (may not be always an aromatic compound), to which at least 3 halogen atoms are bonded, an active hydrogen-containing halogenated aromatic compound, a halogenated aromatic nitro compound or the like may also be used in combination. Preferable examples of the polyhalo-compound as a branching or crosslinking agent include trihalobenzenes.

In order to control the molecular weight or the terminal group of the resulting PAS, a monohalo-organic compound may be added at any state of the polymerization step. Examples of the monohalo-organic compound includes monohalo-substituted saturated or unsaturated aliphatic hydrocarbons such as monohalopropanes, monohalobutanes, monohaloheptanes, monohalohexanes, aryl halides and chloroprene; monohalo-substituted saturated cyclic hydrocarbons such as monohalocyclohexanes and monohalodecalins; and monohalo-substituted aromatic hydrocarbons such as monohalobenzenes, monohalonaphthalenes, 4-chlorobenzoic acid, methyl 4-chlorobenzoate, 4-chlorodiphenyl sulfone, 4-chlorobenzonitrile, 4-chlorobenzotrifluoride, 4-chloronitrobenzene, 4-chloroacetophenone, 4-chlorobenzophenone and benzyl chloride.

The halogen atom means each of fluorine, chlorine, bromine and iodine atoms. Among these halogen atoms, the chlorine atom is preferred. Even an organic compound, on which a chlorine atom has been substituted and which has a substituent such as trifluoromethane extremely low in reactivity compared with the chlorine atom, is included in the monohalo-organic compounds for the sake of convenience.

4. Organic Amide Solvent

In the present invention, an organic amide solvent that is an aprotic polar organic solvent is used as a solvent for a dehydration reaction and a polymerization reaction. The organic amide solvent is preferably stable to an alkali at a high temperature.

Specific examples of the organic amide solvent include amide compounds such as N,N-dimethylformamide and N,N-dimethylacetamide; N-alkylcaprolactam compounds such as N-methyl-caprolactam; N-alkylpyrrolidone compounds or N-cycloalkylpyrrolidone compounds such as N-methyl-2-pyrrolidone and N-cyclohexyl-2-pyrrolidone; N,N-dialkylimidazolidinone compounds such as 1,3-dialkyl-2-imidazolidinones; tetraalkylurea compounds such as tetramethylurea; and hexaalkylphosphoric triamide compounds such as hexamethylphosphoric triamide. These organic amide solvents may be used either singly or in any combination thereof.

Among these organic amide solvents, N-alkylpyrrolidone compounds, N-cycloalkylpyrrolidone compounds, N-alkylcaprolactam compounds and N,N-dialkylimidazolidinone compounds are preferred, and N-methyl-2-pyrrolidone, N-methyl-ε-caprolactam and 1,3-dialkyl-2-imidazolidinones are particularly preferably used.

The amount of the organic amide solvent used in the polymerization reaction in the present invention is generally within a range of from 0.1 to 10 kg per mol of the sulfur source.

5. Phase Separation Agent (Polymerization Aid)

In order to promote the polymerization reaction to obtain a PAS having a high polymerization degree in a short period of time, various kinds of phase separation agents (polymerization aids) may be used in the present invention. The phase separation agent is a compound that is dissolved in the organic amide solvent by itself or under the coexistence of a small amount of water and has a function of lowering the solubility of the PAS in the organic amide solvent. The phase separation agent itself is a compound that is not a solvent for PASs.

As the phase separation agent, may be used a compound generally publicly known as a polymerization aid or phase separation agent for PASs. Specific examples of the phase separation agent include water, organic carboxylic acid metal salts such as alkali metal carboxylates, organic sulfonic acid metal salts, alkali metal halides such as lithium halides, alkaline earth metal halides, aromatic carboxylic acid alkaline earth metal salts, phosphoric acid alkali metal salts, alcohols and paraffinic hydrocarbons. These phase separation agents may be used either singly or in any combination thereof. Among these, water and organic carboxylic acid metal salts are preferred because they are cheap, and water is particularly preferred.

The amount of the polymerization aid used varies with the kind of the compound used. However, it is generally within a range of from 0.01 to 10 mol per mol of the charged sulfur source. In the phase-separation polymerization step, it is preferable to cause water to exist as the phase separation agent in a proportion of from higher than 2.0 mol to not higher than 10 mol per mol of the charged sulfur source in the polymerization reaction system. Another phase separation agent such as the organic carboxylic acid metal salt than water is used within a range of preferably from 0.01 to 3 mol, more preferably from 0.02 to 2 mol, particularly preferably from 0.03 to 1 mol per mol of the charged sulfur source. Even when water is used as the phase separation agent, another phase separation agent may be used as a polymerization aid in combination from the view point of efficiently conducting the phase-separation polymerization.

6. Dehydration Step

A dehydration step is preferably arranged as a preliminary step for a polymerization step to control the amount of water in the reaction system. The dehydration step is performed by a process comprising heating and reacting a mixture containing the organic amide solvent and the alkali metal sulfide, desirably, under an inert gas atmosphere and discharging water outside the system by distillation. When the alkali metal hydrosulfide is used as a sulfur source, the dehydration step is performed by a process comprising heating and reacting a mixture containing the alkali metal hydrosulfide and an alkali metal hydroxide and discharging water outside the system by distillation.

In the dehydration step, the dehydration is conducted until the content of water comprising water of hydration (water of crystallization), a water medium, secondarily produced water, etc. is lowered within a range of necessary amounts. In the dehydration step, the dehydration is conducted until the content of coexisting water in the polymerization reaction system is reduced to generally 0.02 to 2.0 mol, preferably 0.05 to 2.0 mol, more preferably 0.5 to 2.0 mol per mol of the charged sulfur source. The sulfur source after the dehydration step is generally called "a charged sulfur source". When the water content has become too low in the dehydration step, water may be added prior to the polymerization step to regulate the water content to a desired value.

When the alkali metal hydrosulfide is used as the sulfur source in the dehydration step, a mixture containing the organic amide solvent, the alkali metal hydrosulfide and an alkali metal hydroxide in a proportion of 0.95 to 1.05 mol per mol of the alkali metal hydrosulfide is preferably heated and reacted to discharge at least a part of a distillate containing water from the interior of the system containing the mixture to the exterior of the system.

If a molar ratio of the alkali metal hydroxide to a mole of the charged alkali metal hydrosulfide in this step is too low, the amount of a sulfur component (hydrogen sulfide) volatilized off in the dehydration step becomes great, which tends to incur reduction in productivity due to lowering of the amount of the charged sulfur source or cause abnormal reactions and deterioration of quality of a PAS formed due to increase of a polysulfide component in the charged sulfur source remaining after the dehydration. If the molar ratio of the alkali metal hydroxide to a mole of the charged alkali metal hydrosulfide is too high, in some cases, change in properties of the organic amide solvent may be increased, difficulty may be encountered on stably performing the polymerization reaction, or the yield and quality of a PAS formed may be deteriorated. A preferable molar ratio of the alkali metal hydroxide to a mole of the charged alkali metal hydrosulfide in this step is 1.00 to 1.04, more preferably 1.005 to 1.03.

In many cases, a small amount of an alkali metal sulfide is contained in an alkali metal hydrosulfide, so that the amount of the sulfur source involves a total of the alkali metal hydrosulfide and the alkali metal sulfide. No problem arises as to a raw material for the PAS even if the alkali metal hydrosulfide contains the alkali metal sulfide. However, the content thereof is preferably as low as possible for producing a high-quality PAS in the present invention. Even when a small amount of the alkali metal sulfide is mixed in, the molar ratio to the alkali metal hydroxide may be calculated out on the basis of the content (analytical value) of the alkali metal hydrosulfide in the present invention to regulate the molar ratio between them.

The charging of the respective raw materials into a reaction vessel in the dehydration step is conducted within a temperature range of generally from ordinary temperature (5 to 35° C.) to 300° C., preferably from ordinary temperature to 200° C. The charging of the raw materials may not be in order, and the respective raw materials may be additionally charged in the course of the dehydration process. An organic amide solvent is used as a solvent used in the dehydration step. This solvent is preferably the same as the organic amide solvent used in the polymerization step, and N-methyl-2-pyrrolidone is particularly preferred. The amount of the organic amide solvent used is generally of the order of 0.1 to 10 kg per mol of the sulfur source charged in the reaction vessel.

The dehydration process is conducted by heating the mixture after charging the raw materials into the reaction vessel in a temperature range of generally up to 300° C., preferably 100 to 250° C. for generally 15 minutes to 24 hours, preferably 30 minutes to 10 hours. Heating methods include a method of retaining a fixed temperature, a method of raising the temperature either stepwise or continuously and a method of combining both methods. The dehydration step is conducted by, for example, a batch system, a continuous system or a combined system of both systems.

An apparatus for conducting the dehydration step may be the same as a reaction vessel (reactor) used in the subsequent polymerization step or different from it. A material of the apparatus is preferably a corrosion resistant material such as titanium. In the dehydration step, a part of the organic amide solvent is generally discharged together with water outside the reaction vessel. At that time, hydrogen sulfide is discharged as a gas outside the system.

7. Charging Step

In the present invention, an alkali metal hydroxide and water may be added to the mixture remaining in the system after the dehydration step as needed. When the alkali metal hydrosulfide is used as the sulfur source in particular, the mixture is preferably adjusted in such a manner that the total number of moles of the number of moles of an alkali metal hydroxide formed with hydrogen sulfide formed upon the dehydration, the number of moles of the alkali metal hydroxide added prior to the dehydration and the number of moles of the alkali metal hydroxide added after the dehydration becomes 1.00 to 1.09 mol per mol of a charged sulfur source (sulfur source) including the alkali metal hydrosulfide existing in the system after the dehydration as a sulfur source, and the number of moles of water becomes generally 0.02 to 2.0 mol, preferably 0.05 to 2.0 mol, more preferably 0.5 to 2.0 mol per mol of the charged sulfur source. The charged sulfur source means a sulfur source (also referred to as "an available sulfur source") reacted with the dihalo-aromatic compound in the polymerization step.

Since the dehydration step is generally arranged in the production process of the PAS, the amount of the charged sulfur source is calculated out in accordance with an equation, [Charged sulfur source]=[Total moles of sulfur charged]−[Moles of sulfur volatilized off after dehydration].

When hydrogen sulfide is volatilized off in the dehydration step, an alkali metal hydroxide is produced by an equilibrium reaction and comes to remain in the system. Accordingly, it is necessary to exactly grasp the amount of hydrogen sulfide volatilized off to determine a molar ratio of the alkali metal hydroxide to the sulfur source in the charging step.

If the molar ratio of the alkali metal hydroxide to a mole of the charged sulfur source is too high, it is liable to increase change in properties of the organic amide solvent or cause abnormal reactions or decomposition upon polymerization. In addition, the lowering of the yield and quality of a PAS formed is often caused. The molar ratio of the alkali metal hydroxide to a mole of the charged sulfur source is preferably 1.005 to 1.08 mol, more preferably 1.01 to 1.075 mol, particularly preferably 1.02 to 1.075. It is preferred to conduct the polymerization reaction slightly in excess of the alkali metal hydroxide in that the polymerization reaction is stably performed to obtain a high-quality PAS.

8. Polymerization Step

The polymerization step is conducted by charging a dihalo-aromatic compound into the mixture after completion of the dehydration step and heating the sulfur source and the dihalo-aromatic compound in the organic amide solvent. When a polymerization vessel different from the reaction vessel used in the dehydration step is used, the mixture after the dehydration step and the dihalo-aromatic compound are charged into the polymerization vessel. After the dehydration step and before the polymerization step, the amounts of the organic amide solvent and coexisting water may be controlled as needed. Before the polymerization step or during the polymerization step, a polymerization aid and other additives may be mixed.

The mixing of the mixture obtained after completion of the dehydration step with the dihalo-aromatic compound is conducted within a temperature range of generally from 100 to 350° C., preferably from 120 to 330° C. When the respective components are charged into the polymerization vessel, no particular limitation is imposed on the order of charging, and the charging is conducted by partially charging both components in small portions or charging both components at a time.

In general, the polymerization reaction is preferably conducted by a two-stage process of a first-stage polymerization step and a second-stage polymerization step at a temperature ranging from 170 to 290° C. As a heating method, is used a method of retaining a fixed temperature, a method of raising the temperature either stepwise or continuously or a combination of both methods. The polymerization reaction time is within a range of generally from 10 minutes to 72 hours, preferably from 30 minutes to 48 hours. The amount of the organic amide solvent used in the polymerization step is within a range of generally from 0A to 10 kg, preferably from 0.15 to 5 kg per mol of the charged sulfur source existing in the polymerization step. The amount may be changed in the course of the polymerization reaction so far as it falls within this range.

The content of the coexisting water upon the beginning of the polymerization reaction is preferably controlled within a range of generally from 0.02 to 2.0 mol, preferably from 0.05 to 2.0 mol, more preferably from 0.5 to 2.0 mol per mol of the charged sulfur source. It is preferable to increase the content of the coexisting water in the course of the polymerization reaction.

A process, in which the liquid phase within the polymerization reaction system is converted to the phase-separated state at the time a conversion of the dihalo-aromatic compound has reached 80 to 99% after initiation of the polymerization reaction to continue the polymerization reaction, is preferred. In order to convert the liquid phase in the high-temperature state to the phase-separated state, it is preferable to add a phase separation agent or increase the amount of an additive acting as the phase separation agent. No particular limitation is imposed on the phase separation agent. However, water is preferred in that it is cheap, and control of the polymerization reaction and a post treatment are easily conducted.

In the production process according to the present invention, the polymerization step is preferably conducted through at least the following 2-stage steps:

(I) a first-stage polymerization step of subjecting the sulfur source and the dihalo-aromatic compound to a polymerization reaction at a temperature of 170 to 270° C. in the organic amide solvent in a state that water is present in a proportion of 0.02 to 2.0 mol per mol of the charged sulfur source, thereby forming a polymer that a conversion of the dihalo-aromatic compound is 80 to 99%; and (II) a second-stage polymerization step of causing at least one phase separation agent selected from the group consisting of water, organic carboxylic acid metal salts, organic sulfonic acid metal salts, alkali metal halides, alkaline earth metal halides, aromatic carboxylic acid alkaline earth metal salts, phosphoric acid alkali metal salts, alcohols and paraffinic hydrocarbons to exist within a range of from 0.01 to 10 mol per mol of the charged sulfur source and heating the polymerization reaction system to a temperature of 245 to 290° C., thereby converting the liquid phase within the polymerization reaction system to the phase-separated state to continue the polymerization reaction.

In the production process according to the present invention, the polymerization reaction in the polymerization step is more preferably conducted through at least 2-stage polymerization steps comprising:

(1) a first-stage polymerization step of subjecting the sulfur source and the dihalo-aromatic compound to a polymerization reaction at a temperature of 170 to 270° C. in the organic amide solvent in a state that water is present in a proportion of 0.02 to 2.0 mol per mol of the charged sulfur source, thereby forming a polymer that a conversion of the dihalo-aromatic compound is 80 to 99%; and (2) a second-stage polymerization step of controlling the amount of water in the polymerization reaction system so as to bring about a state that water exists in a proportion of from higher than 2.0 mol to not higher than 10 mol per mol of the charged sulfur source, and heating the polymerization reaction system to a temperature of 245 to 290° C., thereby converting the liquid phase within the polymerization reaction system to the phase-separated state to continue the polymerization reaction.

The amount of the coexisting water in the reaction system in the first-stage polymerization step is within a range of from 0.02 to 2.0 mol, preferably from 0.05 to 2.0 mol, more preferably from 0.5 to 2.0 mol, particularly preferably 1.0 to 1.9 mol per mol of the charged sulfur source. If the amount of the coexisting water is too small, unpreferable reactions such as decomposition of a PAS formed are easy to occur. If the amount of the coexisting water exceeds 2.0 mol on the other hand, a polymerization rate becomes markedly low, or decomposition of the organic amide solvent and a PAS formed is easy to occur. Thus, such a too small or great amount is not preferable. When water is used as the phase separation agent in the second-stage polymerization step, it is desirable to control the amount of the coexisting water in the reaction system in the first-stage polymerization step within a range of preferably from 0.5 to 2.0 mol, more preferably from 1.0 to 1.9 mol per mol of the charged sulfur source.

The polymerization is conducted within a temperature range of from 170 to 270° C., preferably from 180 to 265° C. If the polymerization temperature is too low, the polymerization rate becomes too slow. If the polymerization temperature is a high temperature exceeding 270° C. on the other hand, decomposition of a PAS formed and the organic amide solvent is easy to occur, and the polymerization degree of the PAS formed becomes extremely low. In order to provide a PAS having a high molecular weight (high melt viscosity), it is preferable to control the polymerization temperature in the first-stage polymerization step within a range of from 200 to 255° C.

When water is used as the phase separation agent in the second-stage polymerization step, it is preferable to control the amount of water in the polymerization reaction system so as to bring about a state that water exists in a proportion of from more than 2.0 mol to not more than 10 mol per mol of the charged sulfur source. If the amount of the coexisting water in the reaction system in the second-stage polymerization step is not more than 2.0 mol or more than 10 mol, the polymerization degree of a PAS formed is lowered. It is particularly preferable to conduct the second-stage polymerization in a state that the amount of the coexisting water falls within a range of from 2.2 to 7 mol because a PAS having a high polymerization degree is easy to be obtained. When another phase separation agent (at least one phase separation agent selected from the group consisting of organic carboxylic acid metal salts, organic sulfonic acid metal salts, alkali metal halides, alkaline earth metal halides, aromatic carboxylic acid alkaline earth metal salts, phosphoric acid alkali metal salts, alcohols and paraffinic hydrocarbons) than water is used as the phase separation agent in the second-stage polymerization step, the phase separation agent is preferably caused to exist within a range of from 0.01 to 3 mol per mol of the charged sulfur source.

If the polymerization temperature in the step 2 is lower than 245° C., a PAS having a high polymerization degree is difficult to be obtained. If the polymerization temperature exceeds 290° C., there is a possibility that a PAS formed and the organic amide solvent may be decomposed. In particular, a temperature range of from 250 to 270° C. is preferred because a PAS having a high polymerization degree is easy to be obtained. The second-stage polymerization step in the present invention is not the mere step of fractionating and granulating the PAS prepolymer formed in the first-stage polymerization step, but a step of increasing the polymerization degree of the PAS prepolymer. In the second-stage polymerization step, water acts as the phase separation agent.

Water is preferably used as the phase separation agent in the second-stage polymerization step. However, it is preferable to use another phase separation agent (polymerization aid) together with water within a range of from 0.01 to 3 mol per mol of the charged sulfur source. For example, the amount of water in the polymerization reaction system in the second-stage polymerization step is controlled so as to bring about a state that water exists in a proportion of from more than 2.0 mol to not more than 10 mol per mol of the charged sulfur source, and moreover at least one phase separation agent (polymerization aid) selected from the group consisting of organic carboxylic acid metal salts, organic sulfonic acid metal salts, alkali metal halides, alkaline earth metal halides, aromatic carboxylic acid alkaline earth metal salts, phosphoric acid alkali metal salts, alcohols and paraffinic hydrocarbons may be caused to exist within a range of from 0.01 to 3 mol per mol of the charged sulfur source.

When the alkali metal hydrosulfide is used as the sulfur source, the polymerization step is preferably conducted through at least the following 4 steps:

(a) a dehydration step a of heating and reacting a mixture containing the organic amide solvent, the alkali metal hydrosulfide and an alkali metal hydroxide in a proportion of 0.95 to 1.05 mol per mol of the alkali metal hydrosulfide to discharge at least a part of a distillate containing water from the interior of the system containing the mixture to the exterior of the system;

(b) a charging step b of adding an alkali metal hydroxide and water to the mixture remaining in the system after the dehydration step, as needed, to adjust the mixture in such a manner that the total number of moles of the number of moles of an alkali metal hydroxide formed with hydrogen sulfide formed upon the dehydration, the number of moles of the alkali metal hydroxide added prior to the dehydration and the number of moles of the alkali metal hydroxide added after the dehydration becomes 1.00 to 1.09 mol per mol of a charged sulfur source including the alkali metal hydrosulfide existing in the system after the dehydration as a sulfur source, and the number of moles of water becomes 0.02 to 2.0 mol per mol of the charged sulfur source;

(c) a first-stage polymerization step c of adding the dihaloaromatic compound to the mixture to subject the charged sulfur source and the dihalo-aromatic compound to a polymerization reaction at a temperature of 170 to 270° C. in the organic amide solvent, thereby forming a polymer that a conversion of the dihalo-aromatic compound is 80 to 99%; and (d) a second-stage polymerization step d of causing at least one phase separation agent selected from the group consisting of water, organic carboxylic acid metal salts, organic sulfonic acid metal salts, alkali metal halides, alkaline earth metal halides, aromatic carboxylic acid alkaline earth metal salts, phosphoric acid alkali metal salts, alcohols and paraffinic hydrocarbons to exist within a range of from 0.01 to 10 mol per mol of the charged sulfur source and heating the polymerization reaction system to a temperature of 245 to 290° C., thereby converting the liquid phase within the polymerization reaction system to the phase-separated state to continue the polymerization reaction.

When the alkali metal hydrosulfide is used as the sulfur source, the polymerization step is more preferably conducted through at least the following 4 steps:

(A) a dehydration step 1 of heating and reacting a mixture containing the organic amide solvent, the alkali metal hydrosulfide and the alkali metal hydroxide in a proportion of 0.95 to 1.05 mol per mol of the alkali metal hydrosulfide to discharge at least a part of a distillate containing water from the interior of the system containing the mixture to the exterior of the system;

(B) a charging step 2 of adding an alkali metal hydroxide and water to the mixture remaining in the system after the dehydration step, as needed, to adjust the mixture in such a manner that the total number of moles of the number of moles of an alkali metal hydroxide formed with hydrogen sulfide formed upon the dehydration, the number of moles of the alkali metal hydroxide added prior to the dehydration and the number of moles of the alkali metal hydroxide added after the dehydration becomes 1.00 to 1.09 mol per mol of a charged sulfur source including the alkali metal hydrosulfide existing in the system after the dehydration as a sulfur source, and the number of moles of water becomes 0.02 to 2.0 mol per mol of the charged sulfur source;

(C) a first-stage polymerization step 3 of adding the dihalo-aromatic compound to the mixture to subject the charged sulfur source and the dihalo-aromatic compound to a polymerization reaction at a temperature of 170 to 270° C. in the organic amide solvent, thereby forming a polymer that a conversion of the dihalo-aromatic compound is 80 to 99%; and (D) a second-stage polymerization step 4 of controlling the amount of water in the polymerization reaction system so as to bring about a state that water exists in a proportion of from more than 2.0 mol to not more than 10 mol per mol of the charged sulfur source, and heating the polymerization reaction system to a temperature of 245 to 290° C., thereby converting the liquid phase within the polymerization reaction system to the phase-separated state to continue the polymerization reaction.

The amount of the coexisting water in the reaction system in the first-stage polymerization step c or 3 is within a range of from 0.02 to 2.0 mol, preferably from 0.05 to 2.0 mol, more preferably from 0.5 to 2.0 mol, particularly preferably 1.0 to 1.9 mol per mol of the charged sulfur source. If the amount of the coexisting water is too small, unpreferable reactions such as decomposition of a PAS formed are easy to occur. If the amount of the coexisting water exceeds 2.0 mol on the other hand, a polymerization rate becomes markedly low, or decomposition of the organic amide solvent and a PAS formed is easy to occur. Thus, such a too small or great amount is not preferable. When water is used as the phase separation agent in the second-stage polymerization step d or 4, the amount of the coexisting water in the reaction system in the first-stage polymerization step c or 3 is desirably controlled within a range of preferably from 0.5 to 2.0 mol, more preferably from 1.0 to 1.9 mol per mol of the charged sulfur source.

When water is used as the phase separation agent in the second-stage polymerization step d or 4, it is preferable to control the amount of water in the polymerization reaction system so as to bring about a state that water exists in a proportion of from more than 2.0 mol to not more than 10 mol per mol of the charged sulfur source. If the amount of the coexisting water in the reaction system in the second-stage polymerization step is not more than 2.0 mol or more than 10 mol, the polymerization degree of a PAS formed is lowered. It is particularly preferable to conduct the second-stage polymerization in a state that the amount of the coexisting water falls within a range of from 2.2 to 7 mol because a PAS having a high polymerization degree is easy to be obtained. When another phase separation agent (at least one phase separation agent selected from the group consisting of organic carboxylic acid metal salts, organic sulfonic acid metal salts, alkali metal halides, alkaline earth metal halides, aromatic carboxylic acid alkaline earth metal salts, phosphoric acid alkali metal salts, alcohols and paraffinic hydrocarbons) than water is used as the phase separation agent in the second-stage polymerization step, the phase separation agent is preferably caused to exist within a range of from 0.01 to 3 mol per mol of the charged sulfur source.

Water is preferably used as the phase separation agent in the second-stage polymerization step d or 4. However, it is preferable to use another phase separation agent together with water within a range of preferably from 0.01 to 3 mol per mol of the charged sulfur source. For example, the amount of water in the polymerization reaction system in the second-stage polymerization step is controlled so as to bring about a state that water exists in a proportion of from more than 2.0 mol to not more than 10 mol per mol of the charged sulfur source, and moreover at least one phase separation agent selected from the group consisting of organic carboxylic acid metal salts, organic sulfonic acid metal salts, alkali metal halides, alkaline earth metal halides, aromatic carboxylic acid alkaline earth metal salts, phosphoric acid alkali metal salts, alcohols and paraffinic hydrocarbons may be caused to exist within a range of from 0.01 to 3 mol per mol of the charged sulfur source.

Other preferred reaction conditions in the first-stage polymerization step c or 3 and the second-stage polymerization step d or 4 are the same as described above.

In the first-stage polymerization step in each of the production processes described above, it is desirable to form a polymer (also referred to as "a prepolymer") having a melt viscosity of generally 0.5 to 30 Pa·s as measured at a temperature of 310° C. and a shear rate of 1,216 sec$^{-1}$ from the viewpoint of providing a high-molecular weight PAS.

The first-stage polymerization step is a stage that the conversion of the dihalo-aromatic compound reaches 80 to 99%, preferably 85 to 98%, more preferably 90 to 97% after initiation of the polymerization reaction and is a step before the liquid phase is converted to the phase-separated state. The conversion of the dihalo-aromatic compound is a value calculated out in accordance with the following equation.

When the dihalo-aromatic compound (abbreviated as "DHA") is added in excess in terms of a molar ratio to the sulfur source, the conversion is calculated out in accordance with the following equation:

$$\text{Conversion} = [(\text{Charged amount (mol) of DHA}) - (\text{Remaining amount (mol) of DHA})]/[(\text{Charged amount (mol) of DHA}) - (\text{Excessive amount (mol) of DHA})] \times 100.$$

In other case, the conversion is calculated out in accordance with the following equation:

$$\text{Conversion} = [(\text{Charged amount (mol) of DHA}) - (\text{Remaining amount (mol) of DHA})]/[(\text{Charged amount (mol) of DHA})] \times 100.$$

No phase-separated state appears in the first-stage polymerization step. In the second-stage polymerization step in which water has been added, the liquid phase within the polymerization reaction system is phase-separated into a concentrated polymer phase high in the content of the polymer (prepolymer) formed in the first-stage polymerization and a dilute polymer phase low in the content of the polymer. The phase-separated state can be visually clearly observed.

In the second-stage polymerization step, the polymerization reaction is continued in the presence of the phase separation agent in the phase-separated state that the concentrated formed polymer phase and the dilute formed polymer phase are present in a mixed state in the liquid phase within the polymerization reaction system. The concentration of PAS in the concentrated phase is generally 30 to 70% by mass, preferably 40 to 60% by mass, more preferably 45 to 55% by mass. The concentration of PAS in the dilute phase is generally 0 to 10% by mass, preferably 0 to 8% by mass, more preferably 0 to 5% by mass.

When the phase-separated state that the concentrated formed polymer phase and the dilute formed polymer phase are present in a mixed state is created in the liquid phase within the polymerization reaction system in the presence of the phase separation agent, the concentrated formed polymer phase is dispersed in the dilute formed polymer phase by stirring, and a condensation reaction between the prepolymers is caused to efficiently progress in the concentrated phase. As a result, the formation of a high-molecular weight PAS is advanced.

Water is preferably used as the phase separation agent in the second-stage polymerization step. However, another phase separation agent (polymerization aid; for example, an organic carboxylic acid metal salt) may be used in place of water or together with water within a range of from 0.01 to 3 mol per mol of the charged sulfur source. For example, it is preferable to control the amount of water in the polymerization reaction system in the second-stage polymerization step so as to bring about a state that water exists in a proportion of from more than 2.0 mol to not more than 10 mol per mol of the charged sulfur source, and moreover to cause at least one phase separation agent selected from the group consisting of organic carboxylic acid metal salts, organic sulfonic acid metal salts, alkali metal halides, alkaline earth metal halides, aromatic carboxylic acid alkaline earth metal salts, phosphoric acid alkali metal salts, alcohols and paraffinic hydrocarbons to exist within a range of from 0.01 to 3 mol per mol of the charged sulfur source.

Water is added in the second-stage polymerization to increase the amount of water for the purpose of lowering the contents of common salt secondarily produced and impurities in the polymer formed or collecting the polymer in the form of granules. The system of the polymerization reaction may be a batch system, a continuous system or a combination of both systems. In the batch-wise polymerization, a system that 2 or more reaction vessels are used, if desired, for the purpose of shortening the polymerization cycle time.

9. Step of Adding Aromatic Compound

In the production process according to the present invention, an aromatic compound is added in a proportion of 0.01 to 20 mol, preferably 0.1 to 10 mol, more preferably 0.5 to 5 mol per 100 mol of the organic amide solvent into the liquid phase containing the organic amide solvent and the formed polymer within the polymerization reaction system, said liquid phase being in the phase-separated state, after the phase-separation polymerization step. Thereafter, the liquid phase is cooled.

The addition of the aromatic compound is preferably conducted at a stage that the liquid phase within the polymerization reaction system is held at a polymerization temperature (for example, 245 to 290° C., preferably 250 to 270° C.) and more preferably conducted immediately after the phase-separation polymerization step. When the phase-separation polymerization is not sufficiently conducted upon the addition of the aromatic compound, the polymerization reaction temperature may be retained after the addition of the aromatic compound to conduct the phase-separation polymerization additionally if desired.

The liquid phase containing the formed polymer is cooled after the addition of the aromatic compound. In the cooling step, it is preferable to slowly cool the liquid phase without quenching it by solvent flashing or the like because a granular polymer is easy to be obtained. The slow cooling is preferably conducted by controlling a temperature-lowering rate to 2.0 to 0.1° C./min to cool the liquid phase. The slow cooling may be conducted by a method of exposing the polymerization reaction system to an ambient environmental temperature (for example, room temperature). In order to control the cooling rate of the liquid phase, a method of circulating a cooling medium through a jacket of the polymerization reaction vessel or refluxing the liquid phase by a reflux condenser may also be adopted.

In the production process according to the present invention, it is desirable to cool the liquid phase slowly by controlling the temperature-lowering rate to preferably 2.0 to 0.1° C./min, more preferably 1.5 to 0.2° C./min, still more preferably 1.3 to 0.3° C./min until the temperature of the liquid phase within the polymerization reaction system is lowered to 220° C. from the polymerization temperature in the phase-separation polymerization step. By such control of the cooling rate, the formation of a granular polymer can be promoted. From 220° C., the liquid phase may be cooled to a desired temperature without temperature control. From 220° C., the polymerization reaction system may be left to stand at the ambient environmental temperature, or the temperature-lowering rate of the liquid phase may be accelerated. A final cooling temperature is preferably controlled to room temperature in that a post treatment step such as filtration is easy. However, the post treatment step such as filtration may be conducted at a temperature of from not lower than room temperature to lower than 220° C. when a slurry containing a polymer sufficiently granulated is formed.

No particular limitation is imposed on the aromatic compound used in this step so far as it is an aromatic compound soluble in the organic amide solvent at the polymerization temperature. As the aromatic compound, is preferred a dihalo-aromatic compound, monohalo-aromatic compound or trihalo-aromatic compound, and the dihalo-aromatic compound is more preferred. As these dihalo-aromatic compound, monohalo-aromatic compound and trihalo-aromatic compound, may be used the same as those used in the polymerization reaction. The aromatic compounds may be used either singly or in any combination thereof.

More specifically, when p-dichlorobenzene is used as the dihalo-aromatic compound in the polymerization reaction, the same p-dichlorobenzene is preferably used as the aromatic compound added after the phase-separation polymerization step. The same dihalo-aromatic compound as in the polymerization step is used after the phase-separation polymerization step, whereby an unreacted dihalo-aromatic compound can be recovered collectively in the post treatment step in addition to the fact that the yield of a granular PAS can be improved.

Even when a reactive aromatic compound such as a dihalo-aromatic compound is used as the aromatic compound, such an aromatic compound does substantially not affect the polymerization reaction because the polycondensation has been already caused to progress at a high level in the phase-separation polymerization step. In fact, the amount of the dihalo-aromatic compound remaining in the polymerization reaction system after the phase-separation polymerization step increases in correspondence to the amount of the dihalo-aromatic compound added after the phase-separation polymerization step. This fact indicates that the dihalo-aromatic compound added after the phase-separation polymerization step substantially no longer participates in the polycondensation.

The amount of the aromatic compound added to the liquid phase after the phase-separation polymerization step is 0.01 to 20 mol, preferably 0.1 to 15 mol, more preferably 0.3 to 10 mol, particularly preferably 0.5 to 8 mol per 100 mol of the organic amide solvent. In many cases, the yield of the granular PAS can be sufficiently improved even when the amount of the aromatic compound added to the liquid phase after the phase-separation polymerization step is of the order of 0.5 to 5 mol, further 0.8 to 3 mol per 100 mol of the organic amide solvent.

The reason why the yield of the granular PAS is increased by adding the aromatic compound to the liquid phase after the phase-separation polymerization step is not always clarified at the present stage. However, it is presumed that in the phase-separated state that the concentrated formed polymer phase and the dilute formed polymer phase are present in a mixed state in the liquid phase within the polymerization reaction system, the aromatic compound is added, whereby a ratio of the concentrated phase to the dilute phase is increased, or the concentration of the PAS in the concentrated phase is increased, thereby increasing the amount of the granular PAS naturally formed from the concentrated phase.

10. Post Treatment Step

In the production process according to the present invention, a post treatment after the polymerization reaction may be conducted in accordance with a method known per se in the art. For example, after completion of the polymerization reaction, a product slurry cooled is separated by filtration as it is or after diluted with water or the like, and the resulting filter cake is washed and filtered repeatedly and then dried, whereby a granular PAS can be collected. The washing is preferably conducted by a suitable combination of water washing, washing with an organic solvent, acid washing, etc. until a secondarily formed alkali metal salt and oligomers are removed.

According to the production process of the present invention, a granular polymer can be formed, so that a method of separating the granular PAS from the reaction mixture by a method of sieving the polymer by means of a screen is preferably adopted because the polymer can be easily separated from by-products, oligomers, etc. The granular PAS may be sifted by a screen while the product slurry is kept at a high-temperature state (for example, at a temperature of from not lower than room temperature to lower than 220° C.).

After the sieving (filtration), the PAS is preferably washed with the same organic amide solvent as the polymerization solvent, or an organic solvent such as a ketone (for example, acetone) or an alcohol (for example, methanol). The PAS may be washed with hot water or the like. The formed PAS may also be treated with an acid or a salt such as ammonium chloride.

11. Poly(arylene sulfide)

According to the production process of the present invention, a granular PAS can be obtained at a high yield. According to the production process of the present invention, the melt viscosity (molecular weight) of the resulting PAS can be retained at a high level. According to the production process of the present invention, a granular PAS having a melt viscosity of generally 0.5 to 5,000 Pa·s, preferably 1 to 1,000 Pa·s, particularly preferably 3 to 800 Pa·s as measured at a temperature of 310° C. and a shear rate of 1,216 $sec^{-1}$ can be provided.

According to the production process of the present invention, a granular polymer captured on a screen having a sieve opening size of 150 μm (100 mesh) can be collected at a yield of generally 80 to 98%, preferably 83 to 97%, particularly preferably 85 to 95%.

According to the production process of the present invention, the average particle diameter of the granular PAS can be increased. This tendency becomes marked in PASs of high melt viscosity grade, whose melt viscosity is 20 Pa·s or higher. According to the production process of the present invention, the average particle diameter of the granular PAS can be increased by preferably at least 10 μm, more preferably at least 20 μm, still more preferably at least 30 μm compared with the conventional processes. The upper limit of increase in the average particle diameter is about 100 μm.

The PAS obtained by the production process according to the present invention may be molded or formed into various injection-molded products or extruded products such as sheets, films, fibers and pipes either singly or by incorporating various kinds of inorganic fillers, fibrous fillers and/or various kinds of synthetic resins as it is or after subjected to oxidative crosslinking. The granular PAS is also useful as a sealing compound or covering material for electronic parts. The PAS is particularly preferably PPS.

EXAMPLES

The present invention will hereinafter be described more specifically by the following Examples and Comparative Examples. However, the present invention is not limited to these examples alone. Measuring methods of physical properties and properties or characteristics in the present invention are as follows.

(1) Yield of Granular Polymer

After completion of a polymerization reaction, the reaction mixture was sifted through a plurality of screens different in sieve opening size and then fractionated and washed. A polymer captured on a screen having a sieve opening size of 150 μm (100 mesh) was regarded as "a granular polymer". Assuming that all the available sulfur component in a charged sulfur source existing in a reaction vessel after a dehydration step was converted to a polymer, the yield of the granular polymer was based on the mass (theoretical amount) of that polymer. When the available sulfur source is charged in excess in terms of a molar ratio to the dihalo-aromatic compound, all the available sulfur source cannot be converted to a polymer. Even in that case, the yield is calculated out on the basis of the amount of the available sulfur source for the present.

(2) Average Particle Diameter of Polymer

The average particle diameter of a granular polymer collected was measured by a sifting method using sieves of mesh #7 (sieve opening size: 2,800 μm), mesh #12 (sieve opening size: 1,410 μm), mesh #16 (sieve opening size: 1,000 μm), mesh #24 (sieve opening size: 710 μm), mesh #32 (sieve opening size: 500 μm), mesh #60 (sieve opening size: 250 μm), mesh #100 (sieve opening size: 150 μm), mesh #145 (sieve opening size: 105 μm) and mesh #200 (sieve opening size: 75 μm) as sieves used.

(3) Melt Viscosity

A melt viscosity was measured by using about 20 g of a dry granular polymer by means of Capirograph 1-C (trademark) manufactured by Toyo Seiki Seisakusho, Ltd.). A flat die of 1 mm in diameter×10 mm in length was used as a capillary, and the temperature was set to 310° C. After the polymer sample was introduced into the apparatus and held for 5 minutes, the melt viscosity was measured at a shear rate of 1,216 sec$^{-1}$.

Comparative Example 1

A 20-liter autoclave was charged with 6,000 g of N-methyl-2-pyrrolidone (hereinafter abbreviated as "NMP"), 2,000 g of an aqueous sodium hydrosulfide solution (NaSH; purity: 60.91% by mass, containing 35.37 g of Na2S) and 1,180 of sodium hydroxide (NaOH; purity: 73.50% by mass). A molar ratio of sodium hydroxide/sulfur source (NaOHJS) was 0.977, and a molar ratio of NaOH/NaSH was 0.997.

After the interior of the autoclave was purged with nitrogen gas, the contents were gradually heated to 200° C. over about 2 hours while stirring at 250 rpm by a stirrer to distill off 970 g of water ($H_2O$), 870 g of NMP and 13.38 g of hydrogen sulfide ($H_2S$).

After the dehydration step, the contents in the autoclave were cooled to 170° C., and 3,273 g of p-dichlorobenzene (hereinafter abbreviated as "pDCB"), 2,737 g of NMP, 19.29 g of sodium hydroxide and 117 g of water were added. The temperature within the autoclave was lowered to 140° C. A ratio (g/mol) of NMP/charged sulfur source (hereinafter abbreviated as "charged S") in the autoclave was 360, a ratio (mol/mol) of pDCB/charged S was 1.02, a ratio (mol/mol) of $H_2O$/charged S was 1.50, and a ratio (mol/mol) of NaOH/charged S was 1.053.

While stirring the contents in the autoclave at 250 rpm by a stirrer, the contents were heated to 180° C. over 20 minutes and then heated to 220° C. from 180° C. over 60 minutes. After the contents were held for 60 minutes at the temperature of 220° C., the contents were heated to 230° C. from 220° C. over 30 minutes and then held for 90 minutes at the temperature of 230° C. In such a manner, first-stage polymerization was conducted.

After completion of the first-stage polymerization, the number of revolutions of the stirrer was increased to 400 rpm, and 444 g of water was charged under pressure at 230° C. while continuing the stirring of the contents. A ratio (mol/mol) of $H_2O$/charged S was 2.63. After water was charged under pressure, the temperature within the autoclave was lowered to 220° C. Thus, the contents in the autoclave were heated to 260° C. and reacted for 3.25 hours at the temperature of 260° C. to conduct second-stage polymerization.

After completion of the second-stage polymerization, 327 g of NMP was added immediately (within a time that the temperature within the autoclave was substantially not lowered after the polymerization), and the temperature within the autoclave was then lowered to 220° C. from 260° C. over 50 minutes (cooling rate: 0.8° C./min) After cooled to 220° C., the temperature within the autoclave was lowered near to room temperature (about 23° C.) without temperature control.

After the cooling, the contents were filtered through a 100-mesh screen to sift a granular polymer on the screen. The granular polymer was washed with acetone and then 3 times with water. This granular polymer was treated for 30 minutes by immersing it in a 0.4% by mass aqueous solution of acetic acid and then washed with water.

The granular polymer thus obtained had an average particle diameter of 553 µm and a melt viscosity of 77 Pa·s. The yield of the granular polymer was 84%.

Example 1

The charging, dehydration, first-stage polymerization and second-stage polymerization steps were performed according to the same formulation as in Comparative Example 1. After completion of the second-stage polymerization, 160 g (pDCB/NMP=1.3 mol/100 mol) of pDCB and 327 g of NMP were added immediately (within a time that the temperature within the autoclave was substantially not lowered after the polymerization), and the temperature within the autoclave was then lowered to 220° C. from 260° C. over 50 minutes (cooling rate: 0.8° C./min). After cooled to 220° C., the temperature within the autoclave was lowered near to room temperature (about 23° C.) without temperature control.

After the cooling, the contents were filtered through a 100-mesh screen to sift a granular polymer on the screen. The granular polymer was washed with acetone and then 3 times with water. This granular polymer was treated for 30 minutes by immersing it in a 0.4% by mass aqueous solution of acetic acid and then washed with water.

The granular polymer thus obtained had an average particle diameter of 603 µm and a melt viscosity of 73 Pa·s. The yield of the granular polymer was 89%.

As apparent from the results of comparison between Comparative Example 1 and Example 1, it is understood that the yield of the granular PAS is increased to 89% from 84% by adding a small amount of the aromatic compound (pDCB) after the second-stage polymerization step that is the phase-separation polymerization step. The average particle diameter of the granular PAS is increased to 603 µm in Example 1 from 553 µm in Comparative Example 1. On the other hand, the melt viscosity of the granular PAS obtained in Example 1 is not very lowered compared with the melt viscosity of the granular PAS obtained in Comparative Example 1.

INDUSTRIAL APPLICABILITY

The PASs according to the present invention can be suitably utilized in a wide variety of fields such as electrical and electronic equipments and automotive equipments.

The invention claimed is:

1. A production process of a granular poly(arylene sulfide), comprising a step of polymerizing a sulfur source and a dihalo-aromatic compound in an organic amide solvent, said polymerization step comprising a phase-separation polymerization step, wherein the polymerization reaction is continued in the presence of a phase separation agent in a phase-separated state and a concentrated formed polymer phase and a dilute formed polymer phase are present in a mixed state in a liquid phase within the polymerization reaction system, wherein the production process comprises:
   (1) a step I of adding an aromatic compound in a proportion of 0.01 to 20 mol per 100 mol of the organic amide solvent into the liquid phase containing the organic amide solvent and a formed polymer within the polymerization reaction system, said liquid phase being in the phase-separated state, after the phase-separation polymerization step;
   (2) a step II of cooling the liquid phase within the polymerization reaction system; and
   (3) a step III of collecting the formed polymer from the liquid phase, and
   wherein the step II comprises a stage in which the liquid phase is slowly cooled by controlling a temperature-lowering rate to 2.0 to 0.1° C./min until the temperature of the liquid phase is lowered to 220° C. from the polymerization temperature in the phase-separation polymerization step.

2. The production process according to claim 1, wherein the aromatic compound added to the liquid phase within the polymerization reaction system in the step I is a dihalo-aromatic compound, monohalo-aromatic compound or trihalo-aromatic compound.

3. The production process according to claim 2, wherein the aromatic compound added to the liquid phase within the polymerization reaction system in the step I is a dihalo-aromatic compound.

4. The production process according to claim 3, wherein the dihalo-aromatic compound added to the liquid phase within the polymerization reaction system in the step I is the same compound as the dihalo-aromatic compound reacted with the sulfur source in the polymerization step.

5. The production process according to claim 1, wherein in the step I, the aromatic compound is added while the temperature of the liquid phase within the polymerization reaction system is held at a polymerization temperature of 245 to 290° C.

6. The production process according to claim 1, wherein the phase separation agent is at least one selected from the group consisting of water, organic carboxylic acid metal salts, organic sulfonic acid metal salts, alkali metal halides, alkaline earth metal halides, aromatic carboxylic acid alkaline earth metal salts, phosphoric acid alkali metal salts, alcohols and paraffinic hydrocarbons.

7. The production process according to claim 1, wherein the phase separation agent is used within a range of from 0.01 to 10 mol per mol of the charged sulfur source.

8. The production process according to claim 1, wherein in the step III, the liquid phase is sifted by a screen having a sieve opening size of 150 μm to collect a granular polymer.

9. The production process according to claim 1, wherein the polymerization step is conducted through at least the following 2 steps:
(I) a first-stage polymerization step of subjecting the sulfur source and the dihalo-aromatic compound to a polymerization reaction at a temperature of 170 to 270° C. in the organic amide solvent in a state that water is present in a proportion of 0.02 to 2.0 mol per mol of the charged sulfur source, thereby forming a polymer that a conversion of the dihalo-aromatic compound is 80 to 99%; and
(II) a second-stage polymerization step of causing at least one phase separation agent selected from the group consisting of water, organic carboxylic acid metal salts, organic sulfonic acid metal salts, alkali metal halides, alkaline earth metal halides, aromatic carboxylic acid alkaline earth metal salts, phosphoric acid alkali metal salts, alcohols and paraffinic hydrocarbons to exist within a range of from 0.01 to 10 mol per mol of the charged sulfur source and heating the polymerization reaction system to a temperature of 245 to 290° C., thereby converting the liquid phase within the polymerization reaction system to the phase-separated state to continue the polymerization reaction.

10. The production process according to claim 1, wherein the polymerization step is conducted through at least the following 2 steps:
(1) a first-stage polymerization step of subjecting the sulfur source and the dihalo-aromatic compound to a polymerization reaction at a temperature of 170 to 270° C. in the organic amide solvent in a state that water is present in a proportion of 0.02 to 2.0 mol per mol of the charged sulfur source, thereby forming a polymer that a conversion of the dihalo-aromatic compound is 80 to 99%; and
(2) a second-stage polymerization step of controlling the amount of water in the polymerization reaction system so as to bring about a state that water exists in a proportion of from higher than 2.0 mol to not higher than 10 mol per mol of the charged sulfur source, and heating the polymerization reaction system to a temperature of 245 to 290° C., thereby converting the liquid phase within the polymerization reaction system to the phase-separated state to continue the polymerization reaction.

11. The production process according to claim 10, wherein in the second-stage polymerization step, the amount of water in the polymerization reaction system is controlled so as to bring about a state that water exists in a proportion of from more than 2.0 mol to not more than 10 mol per mol of the charged sulfur source, and at least one phase separation agent selected from the group consisting of organic carboxylic acid metal salts, organic sulfonic acid metal salts, alkali metal halides, alkaline earth metal halides, aromatic carboxylic acid alkaline earth metal salts, phosphoric acid alkali metal salts, alcohols and paraffinic hydrocarbons is caused to exist within a range of from 0.01 to 3 mol per mol of the charged sulfur source.

12. The production process according to claim 1, wherein the polymerization step is conducted through at least the following 4 steps:
(a) a dehydration step a of heating and reacting a mixture containing the organic amide solvent, an alkali metal hydrosulfide and an alkali metal hydroxide in a proportion of 0.95 to 1.05 mol per mol of the alkali metal hydrosulfide to discharge at least a part of a distillate containing water from the interior of the system containing the mixture to the exterior of the system;
(b) a charging step b of adding an alkali metal hydroxide and water to the mixture remaining in the system after the dehydration step, as needed, to adjust the mixture in such a manner that the total number of moles of the number of moles of an alkali metal hydroxide formed with hydrogen sulfide formed upon the dehydration, the number of moles of the alkali metal hydroxide added prior to the dehydration and the number of moles of the alkali metal hydroxide added after the dehydration becomes 1.00 to 1.09 mol per mol of a charged sulfur source including the alkali metal hydrosulfide existing in the system after the dehydration as a sulfur source, and the number of moles of water becomes 0.02 to 2.0 mol per mol of the charged sulfur source;
(c) a first-stage polymerization step c of adding the dihalo-aromatic compound to the mixture to subject the charged sulfur source and the dihalo-aromatic compound to a polymerization reaction at a temperature of 170 to 270° C. in the organic amide solvent, thereby forming a polymer that a conversion of the dihalo-aromatic compound is 80 to 99%; and
(d) a second-stage polymerization step d of causing at least one phase separation agent selected from the group consisting of water, organic carboxylic acid metal salts, organic sulfonic acid metal salts, alkali metal halides, alkaline earth metal halides, aromatic carboxylic acid alkaline earth metal salts, phosphoric acid alkali metal salts, alcohols and paraffinic hydrocarbons to exist within a range of from 0.01 to 10 mol per mol of the charged sulfur source and heating the polymerization reaction system to a temperature of 245 to 290° C., thereby converting the liquid phase within the polymerization reaction system to the phase-separated state to continue the polymerization reaction.

13. The production process according to claim 1, wherein the polymerization step is conducted through at least the following 4 steps:
(A) a dehydration step 1 of heating and reacting a mixture containing the organic amide solvent, an alkali metal hydrosulfide and an alkali metal hydroxide in a proportion of 0.95 to 1.05 mol per mol of the alkali metal hydrosulfide to discharge at least a part of a distillate containing water from the interior of the system containing the mixture to the exterior of the system;

(B) a charging step 2 of adding an alkali metal hydroxide and water to the mixture remaining in the system after the dehydration step, as needed, to adjust the mixture in such a manner that the total number of moles of the number of moles of an alkali metal hydroxide formed with hydrogen sulfide formed upon the dehydration, the number of moles of the alkali metal hydroxide added prior to the dehydration and the number of moles of the alkali metal hydroxide added after the dehydration becomes 1.00 to 1.09 mol per mol of a charged sulfur source including the alkali metal hydrosulfide existing in the system after the dehydration as a sulfur source, and the number of moles of water becomes 0.02 to 2.0 mol per mol of the charged sulfur source;

(C) a first-stage polymerization step 3 of adding the dihalo-aromatic compound to the mixture to subject the charged sulfur source and the dihalo-aromatic compound to a polymerization reaction at a temperature of 170 to 270° C. in the organic amide solvent, thereby forming a polymer that a conversion of the dihalo-aromatic compound is 80 to 99%; and (D) a second-stage polymerization step 4 of controlling the amount of water in the polymerization reaction system so as to bring about a state that water exists in a proportion of from more than 2.0 mol to not more than 10 mol per mol of the charged sulfur source, and heating the polymerization reaction system to a temperature of 245 to 290° C., thereby converting the liquid phase within the polymerization reaction system to the phase-separated state to continue the polymerization reaction.

14. The production process according to claim 13, wherein in the charging step 2, the mixture is adjusted in such a manner that the total number of moles of the alkali metal hydroxide becomes 1.005 to 1.08 mol per mol of the charged sulfur source.

15. The production process according to claim 13, wherein in the second-stage polymerization step 4, the amount of water in the polymerization reaction system is controlled so as to bring about a state that water exists in a proportion of from more than 2.0 mol to not more than 10 mol per mol of the charged sulfur source, and at least one phase separation agent selected from the group consisting of organic carboxylic acid metal salts, organic sulfonic acid metal salts, alkali metal halides, alkaline earth metal halides, aromatic carboxylic acid alkaline earth metal salts, phosphoric acid alkali metal salts, alcohols and paraffinic hydrocarbons is caused to exist within a range of from 0.01 to 3 mol per mol of the charged sulfur source.

* * * * *